US009918238B2

(12) United States Patent
Chou

(10) Patent No.: US 9,918,238 B2
(45) Date of Patent: Mar. 13, 2018

(54) USER EQUIPMENT DISTRIBUTION INFORMATION COLLECTION

(71) Applicant: INTEL IP CORPORATION, Santa Clara, CA (US)

(72) Inventor: Joey Chou, Scottsdale, AZ (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/088,959

(22) Filed: Apr. 1, 2016

(65) Prior Publication Data
US 2016/0219445 A1 Jul. 28, 2016

Related U.S. Application Data

(63) Continuation of application No. 14/451,694, filed on Aug. 5, 2014.

(60) Provisional application No. 61/924,194, filed on Jan. 6, 2014, provisional application No. 61/879,014, filed on Sep. 17, 2013, provisional application No. 61/863,902, filed on Aug. 8, 2013.

(51) Int. Cl.
H04W 16/00 (2009.01)
H04W 24/02 (2009.01)
H04W 16/18 (2009.01)
G01S 5/12 (2006.01)
H04W 16/30 (2009.01)

(52) U.S. Cl.
CPC .............. H04W 24/02 (2013.01); G01S 5/12 (2013.01); H04W 16/18 (2013.01); H04W 16/30 (2013.01)

(58) Field of Classification Search
CPC ........................... H04W 16/00; H04W 24/02

USPC .............................................. 455/446, 452.1
See application file for complete search history.

(56) References Cited

U.S. PATENT DOCUMENTS

| 5,095,500 | A | * | 3/1992 | Tayloe | H04W 24/00 379/32.01 |
| 7,162,203 | B1 | * | 1/2007 | Brunner | H04W 16/06 455/522 |
| 2004/0102195 | A1 | * | 5/2004 | Naghian | H04W 4/02 455/456.1 |
| 2006/0009236 | A1 | * | 1/2006 | Bose | G01S 5/0252 455/456.1 |

(Continued)

FOREIGN PATENT DOCUMENTS

JP 2001-054157 A 2/2001
JP 2012-526425 A 10/2012

(Continued)

OTHER PUBLICATIONS

3GPP TSG RAN WG1 Meeting #56—R1-090936; UE Positioning Based on AoA+TA for LTE Rel-9; CATT; Feb. 9-13, 2009; Athens, Greece; Agenda item: 10.

Primary Examiner — Kevin Kim
(74) Attorney, Agent, or Firm — Thorpe North & Western

(57) ABSTRACT

A base station operable to adapt cell coverage based on user equipment (UE) distribution information for a communications network is disclosed. The base station can determine UE distribution information for a cell formed by the base station. The UE distribution information can indicate a geographical distribution of UEs in the cell. The base station can trigger an adjustment of a coverage area of the cell formed by the base station based on the UE distribution information for the cell.

17 Claims, 8 Drawing Sheets

(56) References Cited

U.S. PATENT DOCUMENTS

| | | | | |
|---|---|---|---|---|
| 2008/0200187 A1* | 8/2008 | Lin | ............................ | G01S 5/02 |
| | | | | 455/456.6 |
| 2013/0040648 A1 | 2/2013 | Yang et al. | | |
| 2013/0116011 A1* | 5/2013 | Lee | ........................ | H04W 16/28 |
| | | | | 455/562.1 |
| 2015/0011232 A1* | 1/2015 | Zhang | .................... | H04W 16/08 |
| | | | | 455/453 |

FOREIGN PATENT DOCUMENTS

| | | |
|---|---|---|
| JP | 2012-248957 A | 12/2012 |
| JP | 2014-527619 A | 10/2014 |
| KR | 10-2012-0007532 | 1/2012 |
| KR | 10-2013-0072852 | 7/2013 |
| WO | WO 2012-015041 A | 2/2012 |
| WO | WO 2013-003513 A | 1/2013 |

* cited by examiner

| Index x – | Index y – AOA (Unit Degree °) | | | | | | | | | | | |
|---|---|---|---|---|---|---|---|---|---|---|---|---|
| $T_{ADV}$ (Unit Ts) | 0 | 1 | 2 | 3 | 4 | 5 | 6 | 7 | 8 | 9 | 10 | 11 |
| | 0°-30° | 30°-60° | 60°-90° | 90°-120° | 120°-150° | 150°-180° | 180°-210° | 210°-240° | 240°-270° | 270°-300° | 300°-330° | 330°-360° |
| 0 | $0 \leq T_{ADV} < 48$ | | | | | | | | | | | |
| 1 | $48 \leq T_{ADV} < 96$ | | | | | | | | | | | |
| 2 | $96 \leq T_{ADV} < 144$ | | | | | | | | | | | |
| 3 | $144 \leq T_{ADV} < 192$ | | | | | | | | | | | |
| 4 | $192 \leq T_{ADV} < 288$ | | | | | | | | | | | |
| 5 | $288 \leq T_{ADV} < 384$ | | | | | | | | | | | |
| 6 | $384 \leq T_{ADV} < 576$ | | | | | | | | | | | |
| 7 | $576 \leq T_{ADV} < 768$ | | | | | | | | | | | |
| 8 | $768 \leq T_{ADV} < 960$ | | | | | | | | | | | |
| 9 | $960 \leq T_{ADV} < 2048$ | | | | | | | | | | | |
| 10 | $2048 \leq T_{ADV}$ | | | | | | | | | | | |

FIG. 2

USER EQUIPMENT DISTRIBUTION INFORMATION COLLECTION

RELATED APPLICATIONS

This application is a Continuation of U.S. patent application Ser. No. 14/451,694, filed Aug. 5, 2014, which claims the benefit of the following U.S. Provisional Patent Application Ser. No. 61/863,902, filed Aug. 8, 2013; Ser. No. 61/879,014 filed Sep. 27, 2013; and Ser. No. 61/924,194 filed Jan. 6, 2014, each of which are hereby incorporated by reference in their entirety.

BACKGROUND

Cell coverage and bandwidth capabilities are typically decided during a network planning phase. However, during the network planning phase an exact amount of traffic and a distribution of the traffic from user equipment (UEs) are unknown. The traffic load distribution in a cell may be non-uniform because of dynamic behaviors of users in the cell (e.g. the usage levels and activities of the UE) and dynamic environmental conditions (e.g. rush hours, mass events, and so forth).

Service performance as seen by a user can depend on the traffic load in the cell the user is operating in, e.g. on the number of users are sharing the cell resources at a selected location. A user experience and service performance can degrade significantly when there is an increase in a number of UEs using the same cell within a selected geographical area. A determination of a distribution of traffic in a cell for a selected period of time and/or for selected events can be used to configure cell resources according to environmental and user behavior. The cell resources can be configured to increase an efficient use of cell resources and to serve as many customers as possible at a selected level of service.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 depicts a 2D table of bins for a performance management (PM) UE distribution identified using $T_{ADV}$ measurements and AOA measurements in accordance with an example;

Figure 1:
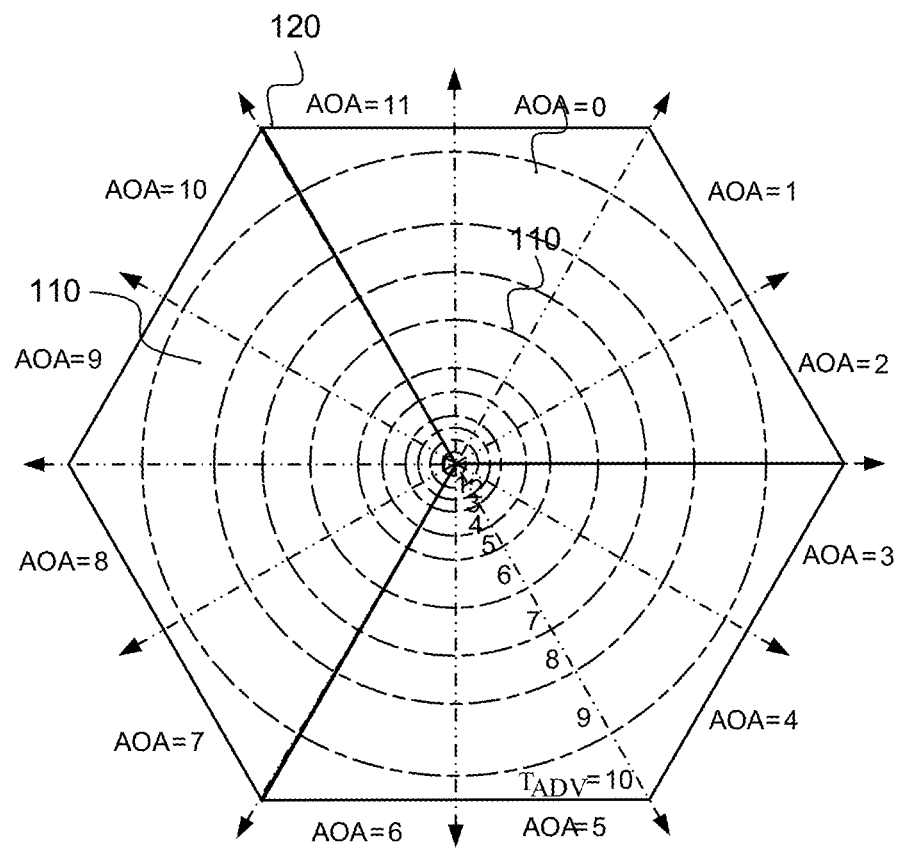
FIG. 1 depicts a cell in a communication network with two dimensional (2D) bins based on a timing advance ($T_{ADV}$) measurement and an angle of arrival (AOA) measurement of a user equipment (UE) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

User equipment (UE) distribution in a cell can be measured by an enhanced Node B (eNode B) to determine a time and place where a traffic surge event occurs. Spatial data and temporal data can be used to trigger a selected action to adjust for a surge or sudden increase in a traffic load of a cell. In one embodiment, the selected action can be adjusting coverage of a neighboring cell which has a lighter traffic load to provide additional capacity to UEs in the cell where the surge occurs. In another embodiment, the selected action can be to identify one or more locations in a cell for future small cell deployment to mitigate traffic congestion issues.

In one embodiment, a capacity level or coverage area of a cell can be dynamically adjusted based on continuous, semi-continuous, or periodic spatial and temporal measurements of UEs in the cell. In another embodiment, a distribution of UEs in a cell can be determined using two dimensional (2D) bin measurements. For example, the two dimensional bin measurements can include timing advance ($T_{ADV}$) measurements and an angle of arrival (AOA) measurement from one or more UEs within the cell.

In one embodiment, the $T_{ADV}$ is a signal sent by an eNode B to a UE that the UE uses to advance a timing of transmission from the UE to the eNode B to compensate for propagation delay due to the distance between the UE and the eNode B. In one example, a type 2 $T_{ADV}$ measures a round trip delay of the signal between the UE and the eNode B. In another example, a type 1 $T_{ADV}$ represents a delta value that indicates a timing adjustment on the timing advance that the UE used to send the last data frame. In another example, when an UE receives a type 1 $T_{ADV}$, the timing advance that the UE used to send the last data frame can be adjusted according to the type 1 $T_{ADV}$ to compute the new timing advance for uplink data transmission.

In another embodiment, the AOA is an estimate of an angle of a UE with respect to a geographical reference point or direction, such as a positive angle when moving in a counter-clockwise direction from a north reference. The AOA can be determined by an antenna of an eNode B. For example the antenna of the eNode B can use an uplink (UL) channel corresponding to the UE to determine the AOA.

In one embodiment, an immediate minimization of drive tests (MDT) can be used to measure a 2D distribution of UEs in a cell. For example, the UE can take selected immediate MDT measurements that include reference signal received power (RSRP) measurements and reference signal received quality (RSRQ) measurements and report the measurements to the eNode B during a cell handoff procedure. In one embodiment, the eNode B can send a radio resource control connection reconfiguration (rrcConnectionReconfiguration) message to the UE to request that the UE report the selected measurements for making a handover decision. In another embodiment, a measurement configuration information element (MeasConfig IE) of the rrcConnectionReconfiguration message can contain scanning information indicating how a UE scans a neighboring cell and a condition that the UE reports in the selected measurements. In one embodiment, the scanning information can include a measurement object evolved universal terrestrial radio access network (MeasObjectEUTRA) message that provides information for intra-frequency or inter-frequency E-UTRA cells. In another embodiment, the scanning information can include a report configuration E-UTRA (ReportConfigEUTRA) message that specifies criteria for triggering of an E-UTRA measurement reporting event.

In one embodiment, the ReportConfigEUTRA message can be monitored, by the eNode B, to determine whether the RSRP and RSRQ that a UE received from the serving cell is higher or lower relative to an RSRP and RSRQ received from neighboring cells. Traditionally, the RSRP and RSRQ measurements are primarily used to determine a time for handover initiation and the reporting event occur when a UE is close to a neighboring cell. Where the reporting event for measuring the RSRP and/or RSRQ is triggered at the handover initiation, the immediate MDT may be limited to UEs at a cell edge and not be used to measure a UE distribution across a whole cell.

In one embodiment, UE measurements can be reported periodically when a trigger type in a ReportConfigEUTRA message is set to periodic. In one embodiment, the handover decision is controlled by the network or eNode B. When a periodic trigger is used, the eNode B receives UE measurement reports continuously prior to making a handover decision. Continuous reporting of RSRP and RSRQ measurements can increase a load to the communications network. Traditionally, reporting of RSRP and RSRQ measurements are based on event triggers to minimize UE measurement reports before a handover is initiated. When a periodic triggered M1 measurement is used to capture UE distribution information across a cell, the UEs in the cell can use the periodic trigger to provide UE measurements necessary for handover. The use of M1 measurements increases an amount of overhead to capture UE distribution information. Traditionally, the location information and M1 measurements (MeasResults) in UE measurement reports can be optional. Accordingly, MDT measurements may not provide measurement information to determine a distribution of UEs.

In one embodiment, an eNode B can use a UE UL timing alignment to measure UE distribution from $T_{ADV}$ measurements and AOA measurements. In one embodiment, the UE UL timing alignment is used on a continuous or periodic basis to synchronize timing information of an eNode B with timing information of a UE. One advantage of using the $T_{ADV}$ information and the AOA information to determine a distribution of UEs can be to determine the UE distribution without increasing overhead.

In one embodiment, UL timing alignment can be used to enable a transmission from a UE to arrive at the eNode B within a selected time window. In another embodiment, when an UL timing of a UE transmission is not aligned with a selected time window at the eNode B, the UE transmission can interference with transmissions from other UEs. In one example, an eNode B can receive a transmission from a UE and use a media access channel (MAC) layer protocol to compute a $T_{ADV}$ to adjust a transmission from the UE to arrive within a defined window at the eNode B. The eNode B can transmit $T_{ADV}$ information to the UE via a $T_{ADV}$ command MAC control element.

In one embodiment, to avoid an UL transmission from a UE interfering with transmissions from other UEs, the UE will not transmit data until the UE verifies that an UL timing of the UE is aligned with a receiving time window of the eNode B. In another embodiment, a UE can use a time alignment timer to determine a time window interval that the UL timing of the UE is assumed to be aligned. In another embodiment, the UE can restart the time alignment timer when the UE receives a timing advance command. When the time alignment timer is running, the UE can assume the UL timing is aligned and can use UL resources allocated to transmit data. When the time alignment timer expires, the UL timing is not aligned and the UE ceases transmitting UL data.

In one embodiment, the eNode B can send the timing advance command to the UE before the time alignment timer expires to maintain the UL timing alignment. In another embodiment, the $T_{ADV}$ command includes a 6 bit field indicating a timing advance index value, e.g. a value between 0 and 63. In another embodiment, the timing advance index value corresponds with a type 1 $T_{ADV}$ command. In one example, the type 1 $T_{ADV}$ command can be used to adjust the UL timing of UEs that were previously timing aligned. In one embodiment, the type 1 $T_{ADV}$ command can be calculated using:

$$T_{ADV} = (e\text{Node } B \; Rx \; \text{time} - e\text{Node } B \; Tx \; \text{time}) + (UE \; Rx \; \text{time} - UE \; Tx \; \text{time}) \quad (1),$$

where eNode B Rx time represents time when a signal is received at the eNode B, eNode B Tx time represents time when a signal is transmitted from the eNode B, UE Rx time represents time when a signal is received at the UE, and UE Tx time represents time when a signal is transmitted from the UE.

In another embodiment, a UE may not to maintain the UL timing alignment. In one example, the UE may not maintain the UL timing alignment when the UE is not transmitting data. In another embodiment, when a UL timing is not aligned, the UE can perform a random access (RA) procedure and receive a timing advance command from the eNode B in a MAC payload of a RA response message.

In one embodiment, a timing advance command field can include an index value $T_a$ used to adjust a timing adjustment of a UE. In another embodiment, the timing advance command field can be 11 bits, e.g. an index value between 0 and 1282 In another embodiment, the 11 bit timing advance command field corresponds with a type 2 $T_{ADV}$ that is measured from an UL radio frame containing a preamble detection and timing advance estimation (PRACH) from the UE. The 11 bit timing advance value can be received at the eNode B and the eNode B can determine $N_{TA}$ using:

$$N_{TA} = T_a \times 16 \quad (2)$$

In one embodiment, the 11 bit timing advance command is an absolute value that represents a time delay or the distance between the UE and the eNode B. In one example, the timing advance command can be a value representing a time between a UE transmitting a signal, the eNode B receiving the signal, the eNode B sending a signal back to the UE, and the UE receiving the signal, e.g. a round-trip signal time delay between the UE and the eNode B. In another embodiment, the 6 bit timing advance command can be a delta value that indicates a timing adjustment of a timing advance that the UE used to send the last data frame. The 6 bit timing advance value can be received at the eNode B and the eNode B can determine a new $N_{TA}$ using:

$$N_{TA,new}=N_{TA,old}+(T_A-31)\times 16 \quad (3)$$

where $N_{TA}$ represent a time delay or a distance between the UE and the eNode B, $N_{TA,new}$ represents a current time delay or the distance between the UE and the eNode B, and $N_{TA,old}$ represents a previous time delay or the distance between the UE and the eNode B.

In one embodiment, a unit of $N_{TA}$ can be a basic unit of time, such as Ts=1/(15000×2048) seconds. In one embodiment, the distance between the UE and the eNode B can be estimated using $N_{TA}$ for UEs with UL timing aligned, e.g. a time alignment timer is running. In another embodiment, the distance between the UE and the eNode B can be estimated using an 11 bit timing advance command for UEs with UL timing not aligned, e.g. a time alignment timer is not running. In one embodiment, the eNode B can estimate an AOA using a UL transmission or part of the UL transmission, such as user data or PRACH. In another embodiment, the eNode B can use sounding reference signals (SRS) to estimate the AOA.

In one embodiment, 2D bin measurements can be determined using a $T_{ADV}$ that was measured when the UE performed a UL timing alignment and using an AOA that was measured when the UE sends an UL transmission either on a data channel or a PRACH channel. FIG. 1 shows a cell 120 in a communication network with 2D bins 110 based on the $T_{ADV}$ measurement and the AOA measurement of the UE.

In one embodiment, a UE distribution performance management (PM) measurement, as shown in FIG. 1, can be used to provide 2D bins 110 to monitor a UE distribution across a geographical area, such as a cell. In one example, the 2D bins can be formed using $T_{ADV}$ and AOA. In one embodiment, a $T_{ADV}$ index and an AOA index are used to identify a column and row of a bin in the 2D table of bins, where x represents $T_{ADV}$ and y represents AOA. In one embodiment, $T_{ADV}$ is equal to $N_{TA}$ for UEs that are UL timing aligned. In another embodiment, the $T_{ADV}$ can be equal to $N_{TA}\times 16$, where $N_{TA}$ is 11 bit timing advance value between 0 and 1282, for UEs that are not UL timing aligned. In another embodiment, the AOA can be measured using a segment of the UL transmission, such as user data frame or PRACH, or using sounding reference signals. In another embodiment, the UE distribution PM measurement can include a component carrier (CC) measurement. In another embodiment, the eNode B can iteratively increase a value of a bin that is identified using $T_{ADV}$ and AOA by a selected value (such as 1) to indicate a number of UEs in a selected bin.

FIG. 2 shows a 2D table of bins for a PM UE distribution identified using $T_{ADV}$ measurements and AOA measurements. In one embodiment, an index x and an index y are used to identify a column and row of a bin in the 2D table of bins, where x represents $T_{ADV}$ and y represents AOA (as shown in FIG. 1). In another embodiment, $T_{ADV}$ can range from 0 to 7690.

In another embodiment, AOA can range from 0 to 719, where each AOA value corresponds to an angle between 0 degrees and 360 degrees. In one embodiment, a sectorized cell can use a subset of index y. For example, for 3-sector cells, the index y for a first sector can be between 0 and 3, the index y for a second sector can be between 4 and 7, the index y for a third sector can be between 8 and 11. In another embodiment, the UE distribution PM measurement can be used for an eNode B with an antenna array. In another embodiment, the index x and the index y can be integer values. In another embodiment, the UE distribution PM measurement can include an MR.UeDistribution.x.y, where x is an integer from 0 to 10 and y is an integer from 0 to 11, as illustrated in the example of FIG. 2. The example is not intended to be limiting. The bin size can be selected to provide a desired geographic resolution used to identify UE location in a cell. In one embodiment, the MR.UeDistribution.x.y can represent a value in each bin and can be a format type of the PM measurement.

In one embodiment, a bin size of each 2D bin may be configurable. For example, a bin size can be adjusted to a selected bin size for a selected area in a cell to provide a selected level of detail for UE distribution information. Each cell may not be the same size. Selected areas may have more bins (i.e. smaller bins) to provide a higher resolution. For example, geographic areas with a higher number of small cells can be configured with smaller bins to provide higher resolution.

Figure 3:
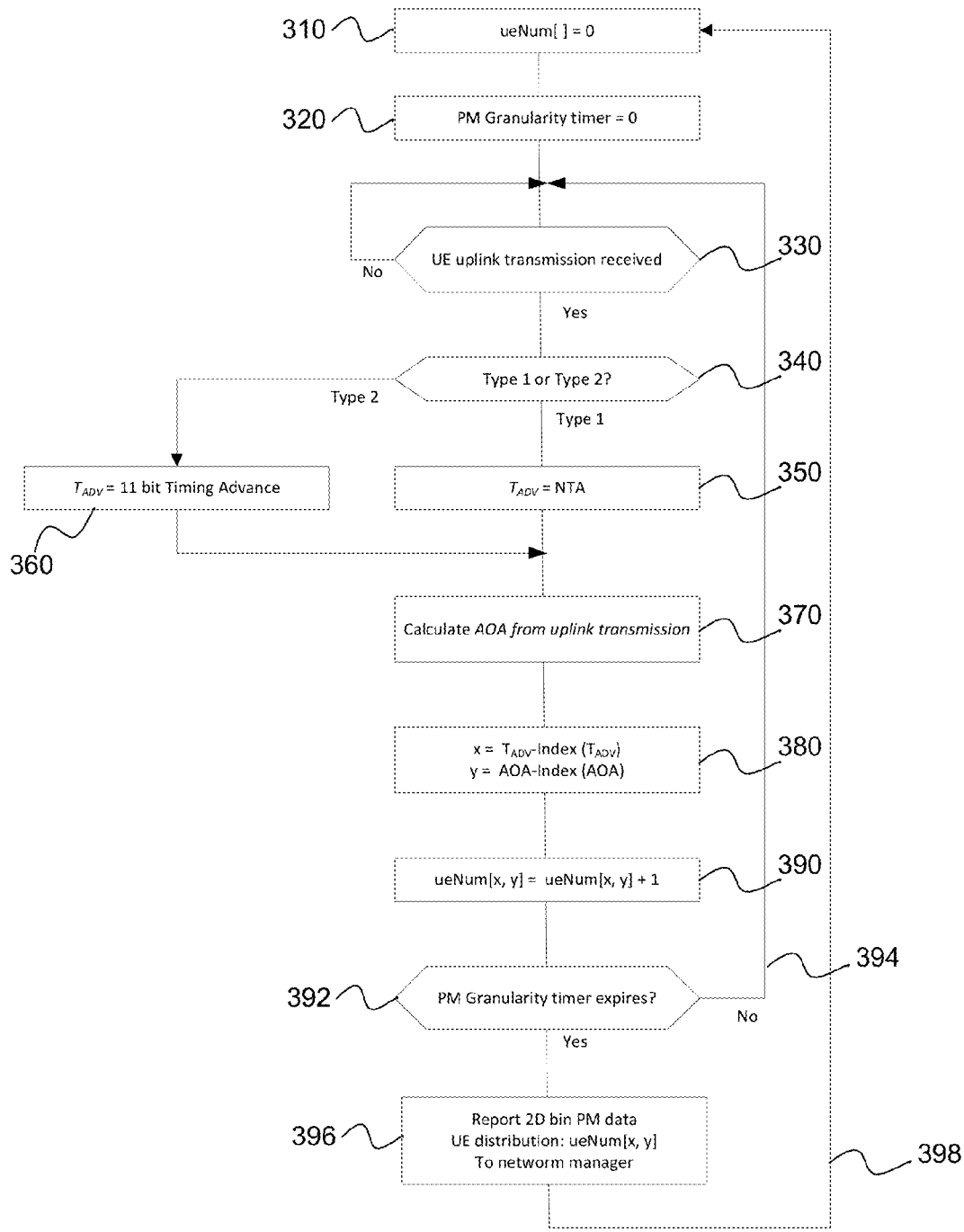
FIG. 3 illustrates a method for collecting UE distribution PM data in a cell of a communication network in accordance with an example.

FIG. 3 shows a flow chart 300 to illustrate a method for collecting UE distribution PM data in a cell of a communications network. In one embodiment, the cell can be divided into 2D bins that are identified by a $T_{ADV}$ index and an AOA index. The method can comprise initialing to zero a count of UEs located in each of the plurality of distribution bins of a PM UE distribution table, when the PM UE distribution table is created or when the PM granularity timer expires, as in block 310. In one example, the eNode B can iterate through each distribution bin corresponding to a $T_{ADV}$ index and an AOA index and initialize the distribution bin to zero. The method can further comprise initializing a PM granularity timer to zero, as in block 320. The method can further comprise iteratively determining if a UE UL transmission is received at the eNode B, until a UE UL transmission is received at the eNode B, as in block 330. The method can further comprise of determining when the UE UL transmission is a type 1 transmission and when the UE UL transmission is a type 2 transmission, as in block 340. In one embodiment, a type 1 transmission is a transmission from the UE where a UL timing of the UE is aligned with a timing window of the eNode B. In another embodiment, a type 2 transmission is a transmission from the UE where a UL timing of the UE is not aligned with a timing window of the eNode B. In one embodiment, when the transmission type is a type 1 transmission then $T_{ADV}$ is $N_{TA}$, as in block 350. In another embodiment, when the transmission type is a type 2 transmission the $T_{ADV}$ is an 11 bit timing advance value, as in block 360.

The method can further comprise computing an AOA for the UE, as in block 370. In one embodiment, the AOA for an uplink transmission can be determined using an antenna array of the eNode B. The method can further comprise computing a $T_{ADV}$-index (represented as x) and an AOA-index (represented as y), as in block 380. The method can further comprise incrementing a UE count for a bin corresponding to the $T_{ADV}$-index and the AOA-index, as in block 390. The method can further comprise determining if the PM granularity timer has expired, as in block 392. When the PM granularity time has not expired, the method can further comprise iterating back through the method disclosed for blocks 330 through 390 until the PM granularity timer has expired, as shown at arrow 394. When the PM granularity timer has expired, the method can further comprise reporting a 2D bin PM UE distribution data to a network manager, as in block 396. The method can further comprise iterating back through the method disclosed for blocks 330 through 396 for a selected period of time, as shown at arrow 398.

Figure 4:
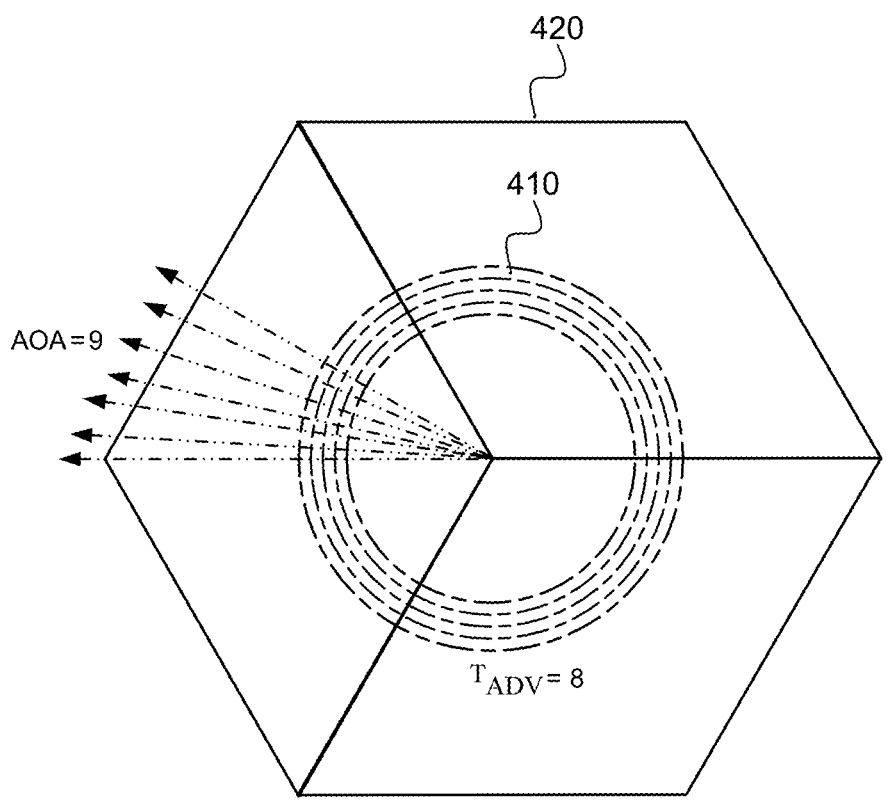
FIG. 4 depicts a plurality of distribution bins for a cell in a communication network in accordance with an example.

FIG. 4 shows a plurality of distribution bins 410 for a cell 420 in a communication network. In one embodiment, a size of each of the distribution bins 410 for a PM UE distribution table for the cell 420 can be configurable or variable. FIG. 4 further shows smaller bin sizes of each of the distribution bins 410 for the PM UE distribution table relative to the bin sizes shown in FIG. 1. In one embodiment, the smaller bins 410 shown in FIG. 4 can provide an increased level of detail for UE distribution information, as previously discussed.

In one embodiment, each UE in a cell of the communications network can have a UE identification (ID). In another embodiment, the eNode B can determine when a UE has been counted in a 2D PM UE distribution table using the UE ID. In one example, a 2D PM UE distribution table can contain 11×12 bins and the eNode B can report 2D PM UE distribution information from the 2D PM UE distribution table to a network manager for a selected PM granularity interval, such as once every 15 minutes. In this example, the eNode B can iteratively determine the 2D PM UE distribution information for the UEs in the cell for 15 minute intervals. In one embodiment, when a UE remains relatively stationary, e.g. remain within the same bin during the PM granularity interval, the eNode B may count the UE multiple times during the PM granularity interval, e.g. when the UE sends multiple UL transmissions during the PM granularity interval. In one example, the bin measurements can provide relative information about UE distribution in a cell. In one embodiment, the eNode B can use the UE ID to determine when a UE sending a UL transmission is in a same bin as when the UE sent an UL transmission previously. In one embodiment, the eNode B can exclude counting the UE again in a 2D PM UE distribution table when the UE has transmitted an UL transmission for the same cell previously during the PM granularity interval.

Figure 5:
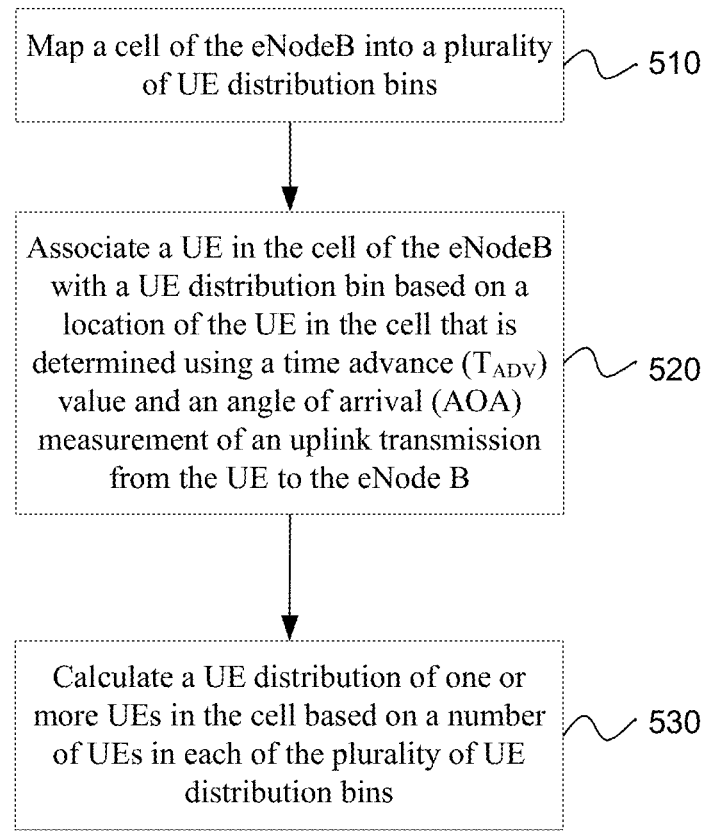
FIG. 5 depicts the functionality of computer circuitry with an eNode B in a communications network that is operable to determine UE distribution information for a communications network in accordance with an example.

Another example provides functionality 500 of computer circuitry of an eNode B in a communications network that is operable to determine UE distribution information for a communications network, as shown in the flow chart in FIG. 5. The functionality can be implemented as a method or the functionality can be executed as instructions on a machine, where the instructions are included on at least one computer readable medium or one non-transitory machine readable storage medium. The computer circuitry can be configured to map a cell of the eNode B into a plurality of UE distribution bins, as in block 510. The computer circuitry can be further configured to associate a UE in the cell of the eNode B with a UE distribution bin based on a location of the UE in the cell that is determined using a $T_{ADV}$ value and an AOA measurement of an UL transmission from the UE to the eNode B, as in block 520. The computer circuitry can also be configured to calculate a UE distribution of one or more UEs in the cell based on a number of UEs in each of the plurality of UE distribution bins, as in block 530.

In one embodiment, the computer circuitry can be further configured to set a PM granularity timer for a selected period of time and iteratively update UE distribution information to the plurality of UE distribution bins until the PM granularity timer expires to form a PM UE distribution. In another embodiment, the computer circuitry can be further configured to use the UE distribution information to trigger selected events, wherein the UE distribution information includes spatial data and temporal data of the cell. In another embodiment, the selected events include adjusting a coverage of a neighboring cell to provide additional capacity or identifying one or more small cell deployment locations to mitigate data traffic congestion. In another embodiment, the computer circuitry can be further configured to create a PM UE distribution table for the plurality of distribution bins to store a number of UEs in each of the plurality of UE distribution bins and initialize to zero a count of UEs located in each of the plurality of distribution bins of the PM UE distribution table, when the PM UE distribution table is created or when the PM granularity timer expires. In another embodiment, the computer circuitry can be further configured to calculate a number of UEs in the UE distribution bin for the cell by: determining a $T_{ADV}$ value and an AOA measurement for an UL transmission of the UE to the eNode B; selecting a $T_{ADV}$ index and an AOA index for the UE based on the $T_{ADV}$ value and the AOA measurement; and associating the UE with a UE distribution bin of the plurality of UE distribution bins in the PM UE distribution table using the $T_{ADV}$ index and the AOA index.

In another embodiment, the computer circuitry can be further configured to receive, at the eNode B, a UE UL transmission for communicating data, and determine a type of the UE UL transmission received from the UE. In another embodiment, the $T_{ADV}$ is a 6 bit timing advance value used to calculate an $N_{TA}$ value when the type of the UE UL transmission is a type 1 transmission and the $T_{ADV}$ is an 11 bit timing advance value when the type of the UE UL transmission is a type 2 transmission. In another embodiment, the AOA measurement is determined using SRS, a user data frame, or a preamble detection and timing advance estimation from uplink radio frames received at a physical random access channel (PRACH) for a type 2 $T_{ADV}$ or at a physical uplink shared channel (PUSCH) for a type 1 $T_{ADV}$. In another embodiment, the computer circuitry can be further configured to determine a distance between the UE and the eNode B using $N_{TA,new}=N_{TA,old}+(TA-31)\times16$, where $N_{TA,new}$ is a $T_{ADV}$ value of a distance between a current location of the UE current location and the eNode B; $N_{TA,old}$ is a $T_{ADV}$ value of a distance between a previous location of the UE and the eNode B; $T_A$ is a 6 bit timing alignment value; (TA−31)×16 is a value times a factor of 16 used to obtain a time value for calculating a distance between the previous location of a UE and the current location of the UE, wherein the calculated distance is used by the UE to synchronize data transmissions to arrive at the eNode B within a selected time window.

In one embodiment, the computer circuitry can be further configured to determine a distance between the UE and the eNode B using $N_{TA}=TA\times16$, wherein $T_A$ is an 11 bit value. In another embodiment, $N_{TA}=T_A\times16$ is used to obtain a time value that is used to calculate an absolute distance between UE and eNode B. In another embodiment, the absolute distance between the UE and the eNode B can be a round trip distance between the UE and the eNode B. In one example, the absolute distance can be half of the distance light travels in $N_{TA}$.

In another embodiment, the UE UL transmission is the type 1 transmission when an UL timing of the UE is aligned with a timing of the eNode B and the UE UL transmission is the type 2 transmission when an UL timing of the UE is not aligned with a timing of the eNode B. In another embodiment, the computer circuitry can be further configured to calculate the $T_{ADV}$ measurement when the type of the UE UL transmission is the type 1 transmission using $T_{ADV}$= (eNode B data receive time−UE data transmission time)+ (UE data receive time−eNode B data transmission time). In another embodiment, the computer circuitry can be further configured to communicate the PM UE distribution information to a network manager when the PM granularity timer expires. In another embodiment, the computer circuitry can be further configured to determine the PM UE distribution for a selected time period and communicate the PM UE distribution information to a network manager at a selected time. In another embodiment, the computer circuitry can be further configured to determine a plurality of UE distributions of the one or more UEs in the cell at selected time periods, assign a UE ID to each of the one or more UEs in the cell, and iteratively add each new UE in a UE distribution bin, wherein the new UE is determined based on the UE ID.

Figure 6:
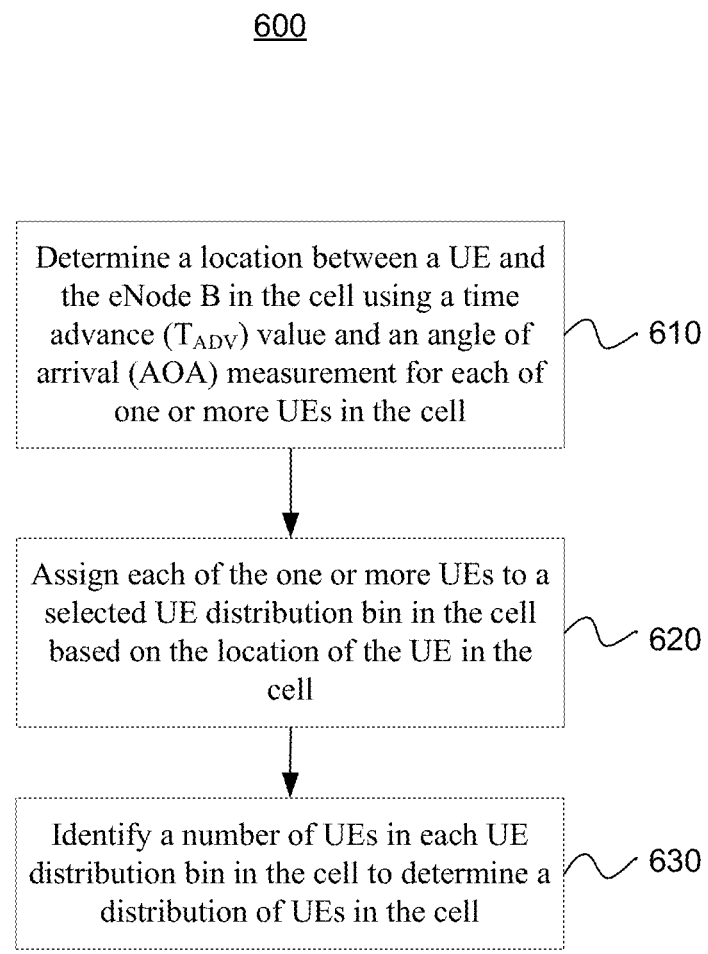
FIG. 6 depicts the functionality of computer circuitry with an eNode B in a communications network that is operable to determine UE distribution information for a cell of the eNode B in accordance with an example.

Another example provides functionality 600 of computer circuitry of an eNode B in a communications network that is operable to determine UE distribution information for a cell of the eNode B, as shown in the flow chart in FIG. 6. The functionality can be implemented as a method or the functionality can be executed as instructions on a machine, where the instructions are included on at least one computer readable medium or one non-transitory machine readable storage medium. The computer circuitry can be configured to determine a location between a UE and the eNode B in the cell using a $T_{ADV}$ value and an AOA measurement for each of one or more UEs in the cell, as in block 610. The computer circuitry can be further configured to assign each of the one or more UEs to a selected UE distribution bin in the cell based on the location of the UE in the cell, as in block 620. The computer circuitry can also be configured to identify a number of UEs in each UE distribution bin in the cell to determine a distribution of UEs in the cell, as in block 630.

In one embodiment, the computer circuitry can be further configured to calculate a distribution of UEs in the cell by mapping the cell to two dimensional array of UE distribution bins, wherein each distribution bin is associated with a selected $T_{ADV}$ value range and an AOA measurement range and assign each UE to a UE distribution bin based on the $T_{ADV}$ value and an AOA measurement for the UE. In one embodiment, the computer circuitry can be further configured to change a size of a UE distribution bin by changing the $T_{ADV}$ value range and the AOA measurement range to provide a desired UE distribution bin size. In one embodiment, the computer circuitry can be further configured to provide a plurality of different sizes of UE distribution bins in the cell. In one embodiment, the computer circuitry can be further configured to select a UE distribution bin size based on a number of nodes with which a UE is configured to communicate. In one embodiment, the computer circuitry can be further configured to iteratively update UE distribution information in the cell until a PM granularity timer expires. In one embodiment, the computer circuitry can be further configured to communicate the UE distribution information to a network manager when the PM granularity timer expires.

Figure 7:
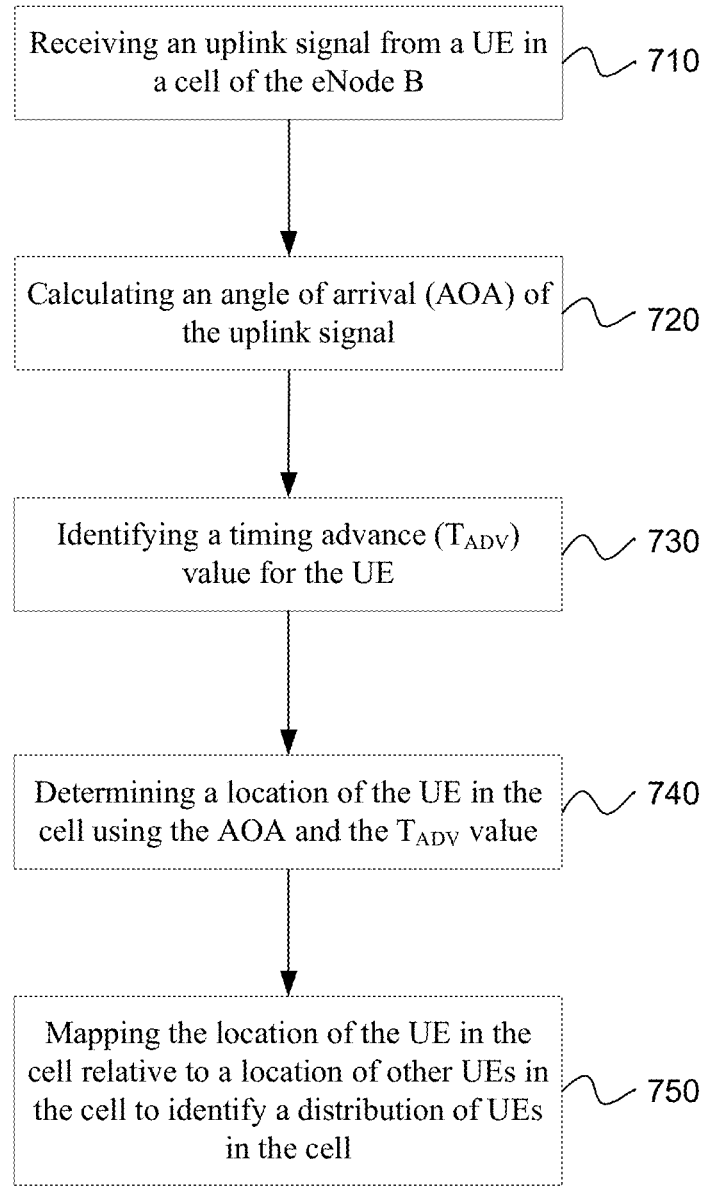
FIG. 7 depicts a product including a non-transitory storage medium having stored thereon instructions that are adapted to be executed to implement a method of determining UE distribution information for a communications network in accordance with an example.

Another example provides functionality 700 of a product including a non-transitory storage medium having stored thereon instructions that are adapted to be executed to implement a method of determining UE distribution information for a communications network, as shown in the flow chart in FIG. 7. The instructions of the product can be implemented as a method or as instructions on a machine, where the instructions are included on at least one computer readable medium or one non-transitory machine readable storage medium. The method can comprise receiving an UL signal from a UE in a cell of the eNode B, as in block 710. The method can further comprise calculating an AOA of the UL signal, as in block 720. The method can further comprise identifying a $T_{ADV}$ value for the UE, as in block 730. The method can further comprise determining a location of the UE in the cell using the AOA and the $T_{ADV}$ value, as in block 740. The method can further comprise mapping the location of the UE in the cell relative to a location of other UEs in the cell to identify a distribution of UEs in the cell, as in block 750.

In one embodiment, the method can further comprise calculating a distribution of UEs in the cell by determining a location for each of a plurality of UEs in the cell using the AOA and the timing advance value of each of the plurality of UEs; mapping the location of each of the plurality of UEs to a two dimensional array of UE distribution bins, wherein each distribution bin is associated with a selected $T_{ADV}$ value range and an AOA measurement range; and assigning each of the plurality of UEs to a UE distribution bin based on the $T_{ADV}$ value and an AOA measurement for the UE. In another embodiment, the method can further comprise selecting one or more UE distribution bin sizes for each of the UE distribution bins of the two dimensional array using bin criteria. In another embodiment, the bin criteria include a selected UE distribution detail level, a selected number of total bins for a cell, and a selected cell coverage area per bin. In one embodiment, the method can further comprise setting a performance management (PM) granularity timer for a selected period of time; iteratively updating the mapping of the location of each of the plurality of UEs in the two dimensional array of UE distribution bins until the PM granularity timer expires to form a PM UE distribution; and communicating PM UE distribution information to a network manager when the PM granularity timer expires.

In one embodiment, the method can further comprise calculating a distribution of UEs in the cell by determining a location for each of a plurality of UEs in the cell using the AOA and the timing advance value of each of the plurality of UEs; mapping the location of each of the plurality of UEs to a two dimensional array of UE distribution bins, wherein each distribution bin is associated with a selected $T_{ADV}$ value range and an AOA measurement range; and assigning each of the plurality of UEs to a UE distribution bin based on the $T_{ADV}$ value and an AOA measurement for the UE. In another embodiment, the method can further comprise selecting one or more UE distribution bin sizes for each of the UE distribution bins of the two dimensional array using bin criteria. In another embodiment, the bin criteria include a selected UE distribution detail level, a selected number of total bins for a cell, and a selected cell coverage area per bin.

In another embodiment, the method can further comprise setting a performance management (PM) granularity timer for a selected period of time; iteratively updating the mapping of the location of each of the plurality of UEs in the two dimensional array of UE distribution bins until the PM granularity timer expires to form a PM UE distribution; and communicating PM UE distribution information to a network manager when the PM granularity timer expires.

Figure 8:
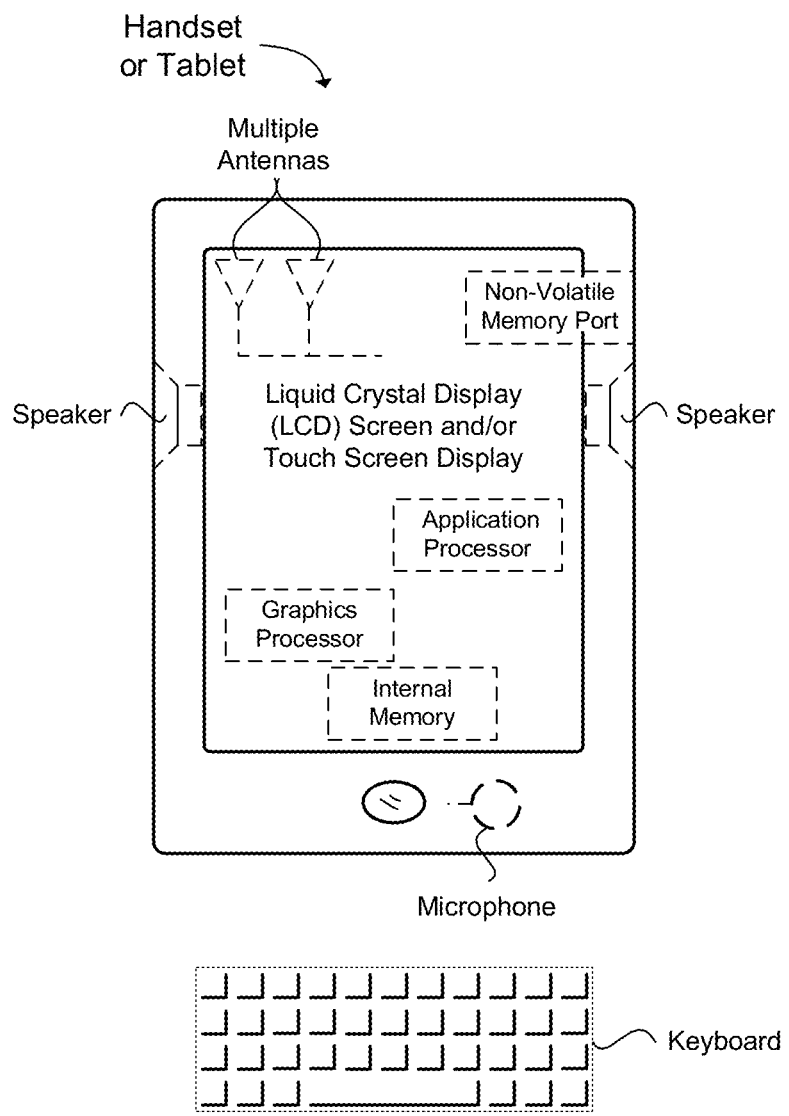
FIG. 8 illustrates a diagram of a UE in accordance with an example.

FIG. 8 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNode B), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of an eNodeB operable to adapt cell coverage based on user equipment (UE) distribution information for a communications network, the apparatus comprising one or more processors and memory configured to:
perform a two-dimensional bin measurement comprising a timing advance measurement and an angle of arrival (AOA) measurement for each of a plurality of user equipments (UEs) in a cell associated with the eNodeB, wherein the two-dimensional bin measurement is performed on uplink (UL) transmissions from the plurality of UEs in the cell to the eNodeB;
monitor a distribution of the plurality of UEs in the cell of the eNodeB based on the two-dimensional bin measurement for each of the plurality of UEs;
trigger, at the eNodeB, an adjustment of a coverage area of the cell formed by the eNodeB based on the distribution of the plurality of UEs in the cell;
adjust a cell size of the cell based on a traffic load of the cell as indicated by the distribution of the plurality of UEs in the cell; and
determine a type of one or more UE UL transmissions received from the plurality of UEs.

2. The apparatus of claim 1, further configured to periodically monitor the distribution of the plurality of UEs in the cell formed by the eNodeB during a defined time period.

3. The apparatus of claim 1, further configured to adjust the coverage area of the cell formed by the eNodeB based on a distribution of users within the cell.

4. The apparatus of claim 1, wherein the eNodeB is configured to communicate with one or more user equipments (UEs) within the cell, wherein the UEs include an antenna, a touch sensitive display screen, a speaker, a microphone, a graphics processor, an application processor, an internal memory, a non-volatile memory port, and combinations thereof.

5. At least one non-transitory machine readable storage medium having instructions embodied thereon for adapting cell coverage based on user equipment (UE) distribution information for a communication network, the instructions when executed perform the following:
determining, using at least one processor of an eNodeB, UE distribution information for a cell formed by the eNodeB, the UE distribution information indicating a distribution of UEs in the cell;
triggering, using the at least one processor of the eNodeB, an adjustment of a coverage area of the cell formed by the eNodeB or a capacity level of the cell formed by the eNodeB based on the UE distribution information for the cell;
adjusting a cell size of the cell based on a traffic load of the cell as indicated by the UE distribution information;
receive, at the eNode B, a UE UL transmission for communicating data; and
determine a type of one or more UE UL transmissions received from the geographical distribution of UEs.

6. The at least one non-transitory machine readable storage medium of claim 5, further comprising instructions when executed perform the following: determining the UE distribution information for the cell using two dimensional (2D) bin measurements.

7. The at least one non-transitory machine readable storage medium of claim 6, wherein the 2D bin measurements are created using timing advance ($T_{ADV}$) measurements and angle of arrival (AOA) measurements reported from one or more UEs within the cell.

8. The at least one non-transitory machine readable storage medium of claim 5, further comprising instructions when executed perform the following: periodically monitoring a UE distribution in the cell formed by the eNodeB during a defined time period.

9. A base station operable to adapt cell coverage based on user equipment (UE) distribution information for a communications network, the base station comprising one or more processors and memory configured to:
determine, at the base station, UE distribution information for a cell formed by the base station, the UE distribution information indicating a geographical distribution of UEs in the cell;
trigger, at the base station, an adjustment of a coverage area of the cell formed by the base station based on the UE distribution information for the cell;
adjust a cell size of the cell based on a traffic load of the cell as indicated by the UE distribution information;
receive, at the eNode B, a UE UL transmission for communicating data; and
determine a type of one or more UE UL transmissions received from the geographical distribution of UEs.

10. The base station of claim 9, further configured to determine the UE distribution information for the cell using two dimensional (2D) bin measurements.

11. The base station of claim 10, wherein the 2D bin measurements are created using timing advance ($T_{ADV}$) measurements and angle of arrival (AOA) measurements reported from one or more UEs within the cell.

12. The base station of claim 9, further configured to periodically monitor a UE distribution in the cell formed by the base station during a defined time period.

13. The base station of claim 9, further configured to adjust the coverage area of the cell formed by the eNodeB based on a distribution of users within the cell.

14. The base station of claim 9, wherein the eNodeB is configured to communicate with one or more user equipments (UEs) within the cell, wherein the UEs include an antenna, a touch sensitive display screen, a speaker, a microphone, a graphics processor, an application processor, an internal memory, a non-volatile memory port, and combinations thereof.

15. An apparatus of an Evolved Universal Terrestrial Radio Access Network (E-TRAN) operable to adapt cell coverage based on user equipment (UE) distribution information, the E-UTRAN comprising one or more processors and memory configured to:
identify, at the E-UTRAN, a two-dimensional bin measurement comprising a timing advance measurement and an angle of arrival (AOA) measurement for each of a plurality of user equipments (UEs) in a cell associated with an eNodeB, wherein the two-dimensional bin measurement is performed on uplink (UL) transmissions from the plurality of UEs in the cell to the eNodeB;
determine, at the E-UTRAN, a distribution of the plurality of UEs in the cell of the eNodeB based on the two-dimensional bin measurement for each of the plurality of UEs;
adjust, a cell size at the E-UTRAN, a based on the distribution of the plurality of UEs in the cell and a traffic load of the cell;

provide additional capacity to the cell formed by the eNodeB based on the distribution of the plurality of UEs in the cell and the traffic load in the cell; and determine a type of one or more UE UL transmissions received from the plurality of UEs.

16. The apparatus of claim 15, further configured to periodically monitor the distribution of the plurality of UEs in the cell formed by the eNodeB during a defined time period.

17. The apparatus of claim 15, further configured to adjust the coverage area of the cell formed by the eNodeB based on a distribution of users within the cell.

* * * * *